United States Patent
Bennetto et al.

(10) Patent No.: US 7,917,904 B2
(45) Date of Patent: Mar. 29, 2011

(54) AUTOMATED ANALYSIS TASKS OF COMPLEX COMPUTER SYSTEM

(75) Inventors: John Bennetto, Seattle, WA (US); Jon B. Avner, Redmond, WA (US); Kevin C. Chase, Redmond, WA (US); Nicole Annette Allen, Kirkland, WA (US); Paul John Bowden, Woodinville, WA (US); Weiguo Zhang, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1373 days.

(21) Appl. No.: 11/327,042

(22) Filed: Jan. 6, 2006

(65) Prior Publication Data

US 2007/0159643 A1 Jul. 12, 2007

(51) Int. Cl.
*G06F 9/46* (2006.01)
*G06F 17/00* (2006.01)

(52) U.S. Cl. .................................. 718/100; 715/200

(58) Field of Classification Search .................. 718/101, 718/102, 106, 108; 705/80; 709/238; 715/200, 715/700; 707/1, 100, 200
See application file for complete search history.

(56) References Cited

U.S. PATENT DOCUMENTS

| | | | |
|---|---|---|---|
| 5,412,802 A | 5/1995 | Fujinami et al. | |
| 6,021,403 A | 2/2000 | Horvitz et al. | |
| 6,236,989 B1 | 5/2001 | Mandyam et al. | |
| 6,298,457 B1 | 10/2001 | Rachlin et al. | |
| 6,311,323 B1 | 10/2001 | Shulman et al. | |
| 6,615,240 B1 | 9/2003 | Sullivan et al. | |
| 6,694,314 B1 | 2/2004 | Sullivan et al. | |
| 6,959,294 B2 | 10/2005 | Sullivan et al. | |
| 7,062,529 B2 * | 6/2006 | Deboer et al. | 709/203 |
| 7,127,520 B2 * | 10/2006 | Ladd et al. | 709/231 |
| 7,231,435 B2 * | 6/2007 | Ohta | 709/221 |
| 7,299,466 B2 * | 11/2007 | Pulsipher et al. | 718/102 |
| 7,577,907 B2 * | 8/2009 | Vishnia-Shabtai et al. | 715/255 |
| 7,577,953 B1 * | 8/2009 | Verego et al. | 718/100 |
| 2002/0006791 A1 | 1/2002 | Nyholm | |
| 2002/0087949 A1 | 7/2002 | Golender et al. | |
| 2002/0188644 A1 * | 12/2002 | Seidman | 709/100 |
| 2003/0014466 A1 * | 1/2003 | Berger et al. | 709/102 |

(Continued)

FOREIGN PATENT DOCUMENTS

CA 2329891 A1 6/2002

(Continued)

OTHER PUBLICATIONS

Sasisekharan, et al., "SCOUT: An Approach to Automating Diagnoses of Faults in Large Scale Networks," 1993 IEEE, 5 pages, ieeexplore.ieee.org/xpl/abs_free.jsp?arNumber=318125.

(Continued)

*Primary Examiner* — Emerson C Puente
*Assistant Examiner* — Adam Lee
(74) *Attorney, Agent, or Firm* — Senniger Powers LLP

(57) ABSTRACT

Automated multiple step tasks are executed on a computing device to analyze a computer system. A step engine performs a complex task such as troubleshooting, performance analysis, or disaster recovery as defined by an input file. The step engine parses the input file into individual steps and dispatches actions of the steps to another device for execution. The device returns a file with the results of the action. The step engine progresses through the list of steps and generates a log file representative of the actions taken and data collected during performance of the task.

10 Claims, 2 Drawing Sheets

U.S. PATENT DOCUMENTS

| | | | |
|---|---|---|---|
| 2003/0028583 A1* | 2/2003 | Flores et al. | 709/105 |
| 2003/0041078 A1 | 2/2003 | Child et al. | |
| 2003/0191826 A1* | 10/2003 | Bellinger et al. | 709/220 |
| 2003/0200266 A1* | 10/2003 | Henry | 709/206 |
| 2003/0229608 A1 | 12/2003 | Reynar et al. | |
| 2003/0229686 A1* | 12/2003 | Kortright | 709/220 |
| 2003/0233435 A1* | 12/2003 | Bazinet et al. | 709/223 |
| 2004/0148367 A1* | 7/2004 | Takano et al. | 709/220 |
| 2005/0138558 A1* | 6/2005 | Duevel et al. | 715/700 |
| 2005/0192917 A1 | 9/2005 | Lubbers et al. | |
| 2005/0198233 A1* | 9/2005 | Manchester et al. | 709/221 |
| 2005/0289115 A1* | 12/2005 | Garden et al. | 707/2 |

FOREIGN PATENT DOCUMENTS

| | | |
|---|---|---|
| EP | 1453270 A1 | 9/2004 |
| WO | 93/25962 A1 | 12/1993 |
| WO | 0057612 A2 | 9/2000 |
| WO | 01/98926 A2 | 12/2001 |
| WO | 02/21749 A2 | 3/2002 |

OTHER PUBLICATIONS

John A. Zinky, "An Example of Automatically Troubleshooting A Throughput Bottleneck Using Model Based Techniques," 1989 IEEE, 6 pages, ieeexplore.ieee.org/xpl.abs_free.jsp?arNumber=49920.

Sylvestre et al., "A Multimedia On-line Assistance System with Safe Remote Control of Applications," 1997 IEEE, 6 pages, ieeexplore.ieee.org/xpl/abs_free.jsp?arNumber=638880.

Forsyth et al., "Using XML and Other Techniques to Enhance Supportability of Diagnostic Expert Systems," 2 pages, springerlink.com/(2orirb45vbzdn0e045u3na45)/app/home/contribution.asp?referrer=parent&backto=issue,45,90;journal,1894,2294;linkingpublicationresults,1:105633,1.

Birrel et al., "Implementing Remote Procedure Calls," ACM Transactions on Computer Systems, vol. 2, No. 1, Feb. 1984, pp. 39-59.

Srinivasan, "RPC 1831: Remote Procedure Call Protocol Specification Version 2," Internet Engineering Task Force, Aug. 1995, 19 pgs.

Nieplocha et al., ARMCI: A Portable Remote Memory Copy Library for Distributed Array Libraries and Compiler Run-Time Systems, Apr. 12-16, 1999, pp. 533-546.

Zhong Chen: "Building Eclipse Instance Messenger," Carleton University, Apr. 25, 2003, pp. 1-49, XP-002443352, scs.carleton.ca/{arpwhite/documents/honoursProjects/paul-chen-2003.pdf.

"JAR File Specification," Jun. 7, 2003, pp. 1-13, XP-002443360, URL: web.archive.org/web/20030607203613/java.sun.com/J2se/1.4.2/docs/guide/jar/jar.html.

* cited by examiner

AUTOMATED ANALYSIS TASKS OF COMPLEX COMPUTER SYSTEM

BACKGROUND

Software and hardware often automatically configure themselves to function in almost any computing environment. Computing device systems and networks can therefore be set up and used by relatively unskilled users. Other computing device related tasks require specialized knowledge not readily available in a single source and may require a lengthy number of complex actions to accomplish the task. Such tasks include troubleshooting, performance analysis, and disaster recovery. For example, there are many problems when managing a large, complex software product. In particular, troubleshooting problems can be very involved and require much domain-specific knowledge. Troubleshooting is also difficult because it often requires pulling data from multiple sources (e.g., performance data, event log data, some data from a variety of files, data from the registry, etc.). Most tools designed to help troubleshoot know how to pull data and analyze data from only a few of these sources. A person wishing to troubleshoot often has to run multiple tools to collect all of the necessary information and learn to interpret all of the results because the results are provided in varying formats.

Unfortunately, many computer-system management tasks can be highly complex and difficult to automate fully. For example, to determine the cause of poor network performance, a user may be required to read a number of engineering specifications, decipher informational sheets from the various manufacturers, and collect data from files not readily accessible in the system itself. Once the user has analyzed the network and determined the cause of the problem, the user must consult additional information resources to determine what remedial measures to take. Another example of these complex tasks is performing disaster recovery on an email server to recover email after a hardware failure. This is computer-system specific and such issues are not only software focused, but require hardware information as well.

Another layer of difficulty with these complex tasks is that they can vary from one version of a computer system to another, and they may involve different types of logic depending on a particular customer's environment. These variables may not always all be known at the time a product is released. Also, disseminating such specific information to customers and support personnel can be a difficult process, even if adequate documentation has been provided.

SUMMARY

Embodiments of the invention overcome one or more deficiencies in known analyses by providing a relatively sophisticated, configuration-driven engine that can automate a complex task in a way that allows it to be easily and automatically updated as new information is gained about the task and how it needs to be applied. Aspects of the invention further define a schema that allows the individual steps in such a task and the flow between the steps to be easily encoded. Advantageously, aspects of the invention consolidate relevant computing system information into a single source and automate data gathering and analysis to facilitate repair of a computing system.

In accordance with one aspect of the invention, configuration files specifying one or more actions of a step of an analysis task or other task to be performed are defined. A step engine may be used to parse an input file that defines the task into a plurality of such steps. The configuration files are dispatched to a data engine which executes the actions. An output file which represents the result of executing the action is received from the data engine. In response to receiving the analysis file, a log file representing the action and the result of the action is generated.

Advantageously, further aspects of the invention may be applied to automating essentially any task which includes a plurality of steps.

Computer-readable media having computer-executable instructions for performing the data gathering and analysis embody further aspects of the invention. Alternatively, the invention may comprise various other methods and apparatuses.

Other objects and features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
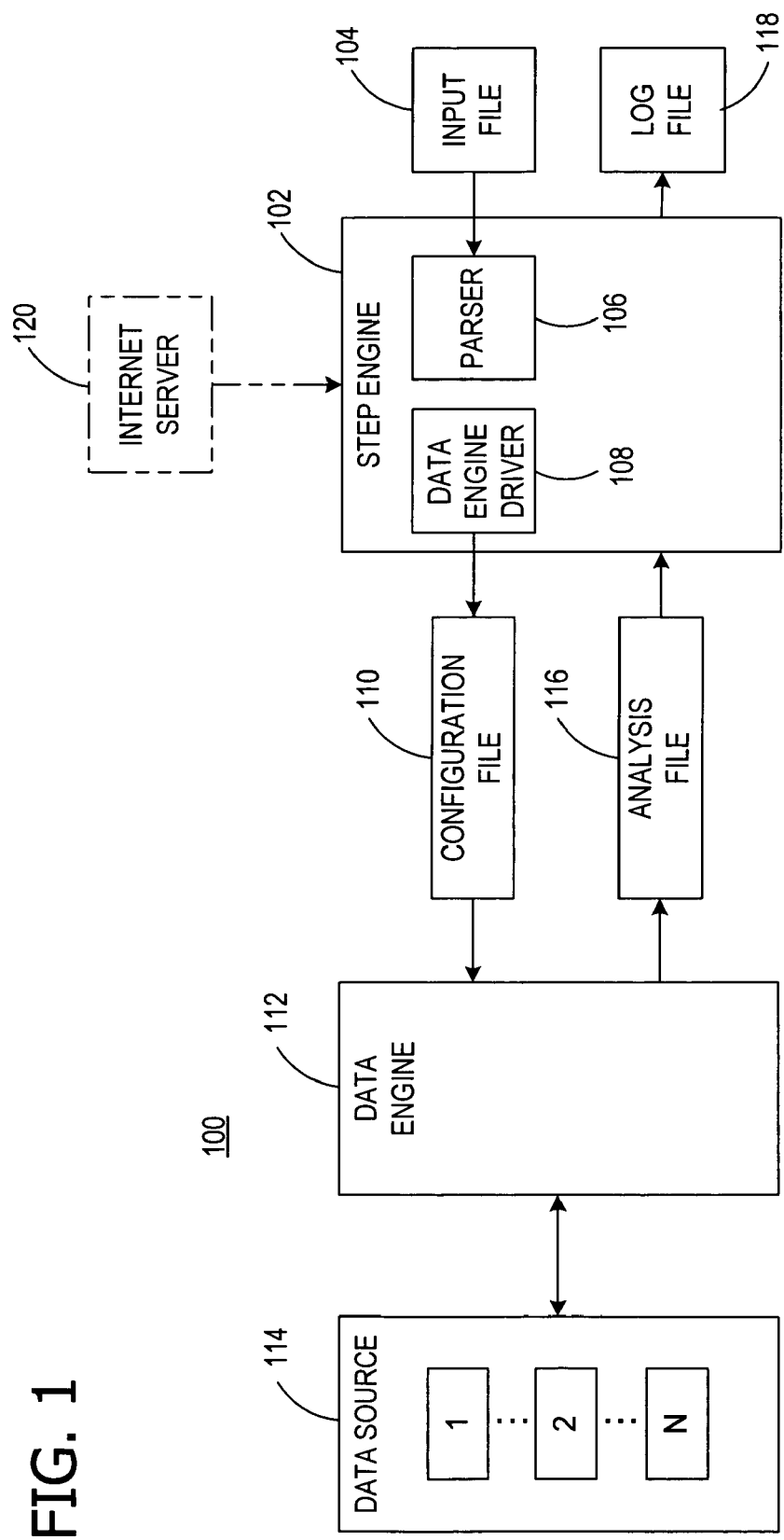
FIG. 1 is a block diagram illustrating one embodiment of a computer-implemented system for automating a task.

Referring to FIG. 1, one embodiment of a computer-implemented system 100 for automating a task is shown. Aspects of the invention permit consolidating relevant computing system information into a single source and automating data gathering and analysis to facilitate tasks, such as repairing a computing system (i.e., hardware and/or software of a computer system). In the illustrated embodiment, a step engine 102, implemented in software, receives an input file 104. The input file 104 may be in extensible markup language (XML) or some other language appropriate to the step engine 102. The input file 104 contains instructions for performing a complex computer-related task such as troubleshooting, performance analysis, determining what disk capacity is needed to deploy a unified-messaging environment, mail-flow analysis, determining if a mail program is properly installed on a client computing device or system, determining why memory usage is relatively high for a computing device or system, or disaster recovery. The step engine 102 may check with a source such as a server 120 on the Internet to determine if the input file 104 is the most recent file generated for performing the task which it defines. If it is not, the step engine 102 may retrieve a more current version. A parser 106 component of the step engine 102 reads the input file 104 and designates a list of steps to be performed. The step engine 102 directs the performance of the listed steps. Each step may require one or more actions. In this embodiment, a data-engine driver 108 encodes one or more actions in a configuration file 110 and dispatches the configuration file to a data engine 112. The data-engine driver 108 may define more than one configuration file 110 for each action.

In one embodiment of the invention, at least one step in the list of steps includes an action involving gathering data either from a user or from the computer system to be analyzed. To accomplish this, a data-engine driver 108 component of the step engine 102 encodes the action into a configuration file 110 that the step engine 102 passes to a data engine 112, also implemented in software. A single configuration file may define more than one action and/or step. The configuration file 110 is, for example, in XML or some other language appropriate for the data engine 112. The data engine 112 receives the configuration file 110 and executes the defined action or actions. The data engine 112 accesses a data source 114 to gather data requested by the defined action. Data sources 1 to n may include files and programs residing on a host computing device, files and programs residing on another computing device in a network, or user input from the user. For example, an action may consist of either executing data engine 112 to retrieve data from the computer system (e.g., registry settings, performance-monitoring counters, the output generated by running another program, etc.) or to retrieve data from a user (e.g., through GUI controls such as a text box, link label, button, tree view, etc.). A single action or step may require a data engine to collect data from multiple computer systems and sources. Step engine 102 may then use the data engine 112 to perform an analysis of the retrieved data. Based on the results of that analysis, step engine 102 may determine the next step to take (the next steps are identified in the input file 104). The results of that analysis may also cause step engine 102 to determine a number of steps that need to be taken. Step engine 102 proceeds in this manner until it encounters an ending step, at which point processing concludes.

The data engine 112 may collect data from more than one data source 114 for a single action. When the data engine 112 has completed the requested action, it generates an output file, such as analysis file 116, which it provides to the step engine 102. In an alternative embodiment, the step engine 102 is adapted to collect user input directly from the user instead of utilizing the data engine 112 to collect the user input.

As the step engine 102 progresses through the list of steps, it generates a log file 118 which it may provide to the user, a program, or simply store on a computer-readable media. In one embodiment, the log file 118 includes the actions taken, and the data gathered. The log file 118 may include different information in other embodiments such as an analysis of the computer system related to the task performed, or a list of remedial steps to be taken in order to resolve a problem with the computer system. The log file 118 may also refer to or identify other data that was collected and stored in separate files.

The system 100 may be implemented in a number of ways. For example, it may run on a single computing device and perform tasks related to that computing device. It may run on one computing device or computer and perform tasks related to another computing device or computer. It may also run on a server and perform tasks related to a network. In one embodiment, the system 100 is a set of software objects and files residing and executing on a computing device. It is also important to note that although the above embodiment describes a list of steps parsed from the input file, steps defining one or more actions, and configuration files embodying one or more actions of one or more steps, that in alternative embodiments of the invention, the parser could parse the input file into a list of actions or configuration files where the configuration files contain the necessary information to perform the task. In such an alternative embodiment, the configuration files are the steps and actions of the task.

The exemplary operating environment for the system 100 illustrated in FIG. 1 includes a general-purpose computing device such as a computer executing computer-executable instructions. The computing device typically has at least some form of computer-readable media. Computer-readable media, which include both volatile and nonvolatile media, and removable and non-removable media, may be any available medium that may be accessed by the general-purpose computing device. By way of example and not limitation, computer-readable media comprise computer storage media and communication media. Computer storage media include volatile and non-volatile, and removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information-delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer-readable media. The computing device includes or has access to computer storage media in the form of removable and/or non-removable, and volatile and/or non-volatile memory. A user may enter commands and information into the computing device through input devices or user-interface selection devices such as a keyboard and a pointing device (e.g., a mouse, trackball, pen, or touch pad). Other input devices, such as a microphone and video camera, (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer may operate in a networked environment using logical connections to one or more remote computers. The remote computer may be a personal computer, a server, a router, a network PC, a peer device or other common network node, and typically includes many or all of the elements described above relative to the computer. Such networking environments are commonplace in offices, enterprise-wide computer networks, intranets, and global computer networks (e.g., the Internet).

Although described in connection with an exemplary computing system environment, aspects of the invention are operational with numerous other general-purpose or special-purpose computing-system environments or configurations. The computing-system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well-known computing systems, environments, and/or configurations that may be suitable for use in embodiments of the invention include, but are not limited to, personal computers, server computers, hand-held or laptop devices, multiprocessor systems, microprocessor-based systems, set-top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory-storage devices.

A Best Practices Analyzer (BPA engine) is an example of a data engine for use with the present invention. One skilled in the art will appreciate that a BPA engine is suitable for use in accordance with embodiments of the present invention. A BPA engine provides a flexible, extensible, uniform, and efficient framework for retrieving and analyzing data from a number of different data sources. Instructions for retrieving and analyzing data are provided in a configuration file, which is defined in a common format irrespective of the different address schemes and access protocols of the different data sources. The configuration file is submitted to a dispatcher, which uses the information therein to dispatch a number of data-source collectors. Each such data-source collector is unique to a corresponding data source and is able to formulate an efficient method for retrieving the necessary data from its corresponding data source. The retrieved data from the different sources and corresponding rules for analyzing the data are then compiled in a data file that is passed to an analyzer. The analyzer evaluates each of the rules based on the retrieved data and may output the results to a portable analysis file.

Figure 2:
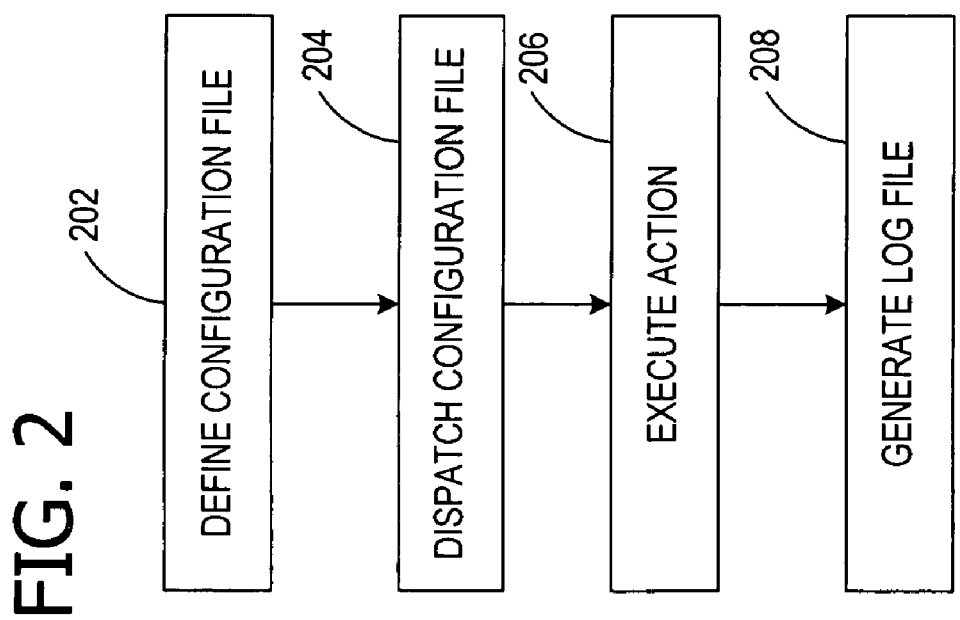
FIG. 2 is an exemplary flow diagram illustrating operations of the computer-implemented system of FIG. 1.

Referring now to FIG. 2, in operation, computing system 100 executes a method for automating analysis of a computing system or for performing some other relatively complex task. In one embodiment, the parser 106 of step engine 102 parses input file 104, which defines the analysis or task, into a set of steps. Data-engine driver 108 may define a set of configuration files 110 from the received input file 104. For example, a configuration file 110 is defined at 202 to specify an action, or actions, needed to accomplish a step in the analysis. At 204, step engine 102 dispatches the configuration file 110 to the data engine 112, which executes the actions defined by each configuration file 110. The step engine 102 receives, from data engine 112, an output file, such as analysis file 116, representing the result of executing the action at 206. Proceeding to 208, step engine 102 generates log file 118 in response to receiving the analysis file 116. As described above, log file 118 represents the actions and the results of the actions. After each action, step engine 102 updates the log file 118 accordingly and may dispatch another configuration file 110 to data engine 112 to perform the next step in the set, or some other step in the set, depending on the contents of the analysis file 116.

Having described the invention in detail, it will be apparent that modifications and variations are possible without departing from the scope of the invention defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer executable method of a step engine for automating execution of a task of a computing system, said task including a plurality of steps, said method comprising:
   retrieving an available update of an input file;
   receiving the input file defining a task to be executed;
   parsing the task in the received input file into a plurality of steps of the task;
   defining a set of configuration files from the received input file, each of said configuration files specifying at least one action and data relating to the computing system, said at least one action being defined by one of the parsed plurality of steps of the task;
   dispatching at least one of the configuration files to a data engine for executing the action specified by the dispatched configuration file, wherein dispatching the at least one of the configuration files includes dispatching a driver to the data engine, said driver being associated with the action specified by the dispatched configuration file;
   dispatching the data engine to gather the data specified by the configuration files;
   receiving an output file from the data engine, said output file representing a result of the data engine executing the action specified by the dispatched configuration file;
   generating a log file in response to receiving the output file, said log file representing the action and the result of executing the action;
   updating the log file as the data engine executes each of the configuration files and provides the output file; and
   generating a next configuration file specifying at least one more action of a step of the task as a function of the received output file and the input file and dispatching the next configuration file to the data engine.

2. The method of claim 1, wherein dispatching the configuration file comprises dispatching a first configuration file and further comprising defining and dispatching a second configuration file after the data engine executes the action specified in the first configuration file.

3. The method of claim 1, further comprising generating, by the data engine, a user interface defined by the configuration file to gather the specified data from a user.

4. The method of claim 1, wherein the task of the computing system comprises one or more of the following: a disaster recovery task, a performance analysis task, a task for determining what disk capacity is needed to deploy a unified-messaging environment, a mail-flow analyzing task, a task for determining if a mail program is properly installed on a client computing device, a task for determining why memory usage is relatively high for a computing device, and a troubleshooting task.

5. A computer-implemented system for automating execution of a task, said task including a plurality of steps, said system comprising a processor executing computer executable instructions for implementing:

a step engine for retrieving an available update to an input file, parsing the input file defining the task into the plurality of steps of the task and for defining and dispatching a plurality of configuration files corresponding to the input file, each configuration file specifying at least one action corresponding to the parsed plurality of steps in the task; and a data engine receiving, and responsive to, each of the dispatched configuration files for executing the at least one action specified by the received configuration file, wherein the data engine is configured to gather data specified by the configuration files, and for transmitting an output file to the step engine, said output file representing an analysis of a result of executing the action, wherein the step engine:

dispatches a driver that is associated with the at least one action specified by the configuration files to the data engine, generates a log file in response to receiving and reading the output file, said log file representing each of the actions executed by the data engine and the result of executing the actions in each of the configuration files, updates the log file as the data engine executes each of the configuration files and provides the output file, and generates a next configuration file specifying another action of a step of the task as a function of the received output file and the input file and dispatching the next configuration file to the data engine.

6. The system of claim 5, wherein the step engine dispatches a first configuration file according to a step in the set of steps and subsequently dispatching a second configuration file according to a step in the set of steps after the data engine executes the action specified in the first configuration file.

7. The system of claim 5, wherein the input file comprises an extensible markup language file.

8. The system of claim 5, wherein the configuration files each comprise an extensible markup language file.

9. The system of claim 5, wherein at least one of the actions specified by the configuration files defines data to be retrieved from a user, said data relating to the task, and further comprising a user interface component defined by at least one of the configuration files to gather the defined data from the user.

10. The system of claim 5, wherein the task comprises one or more of the following: a disaster recovery task, a performance analysis task, a task for determining what disk capacity is needed to deploy a unified-messaging environment, a mail-flow analyzing task, a task for determining if a mail program is properly installed on a client computing device, a task for determining why memory usage is relatively high for a computing device, and a troubleshooting task.

* * * * *